(12) United States Patent
Reddy

(10) Patent No.: US 7,260,067 B2
(45) Date of Patent: Aug. 21, 2007

(54) SPECTRUM AND BIN REASSIGNMENT PROTOCOL FOR ADSL

(75) Inventor: Ajit Reddy, Matawan, NJ (US)

(73) Assignee: Agere Systems Inc., Allentown, PA (US)

( * ) Notice: Subject to any disclaimer, the term of this patent is extended or adjusted under 35 U.S.C. 154(b) by 856 days.

(21) Appl. No.: 09/861,797

(22) Filed: May 22, 2001

(65) Prior Publication Data

US 2002/0176368 A1    Nov. 28, 2002

(51) Int. Cl.
*H04J 1/00* (2006.01)
*H04J 1/16* (2006.01)
*H04B 1/38* (2006.01)

(52) U.S. Cl. .............. 370/252; 370/281; 370/468; 375/222; 375/225

(58) Field of Classification Search ........ 370/431, 370/437, 465, 480, 235, 258, 338, 503, 252, 370/281, 468; 375/219, 222, 220, 225; 379/93.32
See application file for complete search history.

(56) References Cited

U.S. PATENT DOCUMENTS

| | | | |
|---|---|---|---|
| 5,495,483 A | 2/1996 | Grube et al. | |
| 5,521,906 A | 5/1996 | Grube et al. | |
| 5,987,069 A * | 11/1999 | Furukawa et al. | 375/285 |
| 5,999,518 A * | 12/1999 | Nattkemper et al. | 370/258 |
| 5,999,563 A * | 12/1999 | Polley et al. | 375/222 |
| 6,031,868 A * | 2/2000 | Robertson et al. | 375/222 |
| 6,055,268 A * | 4/2000 | Timm et al. | 375/229 |
| 6,167,095 A * | 12/2000 | Furukawa et al. | 375/285 |
| 6,215,793 B1 * | 4/2001 | Gultekin et al. | 370/465 |
| 6,252,900 B1 * | 6/2001 | Liu et al. | 375/219 |
| 6,310,909 B1 * | 10/2001 | Jones | 375/220 |
| 6,345,071 B1 * | 2/2002 | Hamdi | 375/222 |
| 6,351,487 B1 * | 2/2002 | Lu et al. | 375/225 |
| 6,424,631 B1 * | 7/2002 | Czaja et al. | 370/252 |
| 6,445,773 B1 * | 9/2002 | Liang et al. | 379/1.04 |
| 6,711,207 B1 * | 3/2004 | Amrany et al. | 375/222 |
| 6,778,517 B1 * | 8/2004 | Lou et al. | 370/338 |
| 6,829,251 B2 * | 12/2004 | Duvaut et al. | 370/468 |
| 6,904,082 B2 * | 6/2005 | Jones | 375/220 |
| 2002/0090008 A1 * | 7/2002 | Cioffi et al. | 370/503 |
| 2002/0114383 A1 * | 8/2002 | Belge et al. | 375/222 |
| 2002/0118733 A1 * | 8/2002 | Frenkel | 375/219 |
| 2003/0016797 A1 * | 1/2003 | Zakrzewski et al. | 379/93.32 |

* cited by examiner

*Primary Examiner*—Alpus H. Hsu
(74) *Attorney, Agent, or Firm*—Duane Morris LLP

(57) ABSTRACT

A system and method for improving communications, wherein Frequency Division Multiplexed (FDM) modems are communicatively coupled over a bi-directional channel. Bandwidth is apportioned to satisfy a desired downstream-to-upstream data rate ratio by measuring upstream and downstream channel parameters and determining a data rate ratio. The determined ratio is compared to the desired ratio, and if the determined ratio is less than the desired ratio, the bandwidth is adjusted, and the process repeats until the desired ratio is obtained.

42 Claims, 3 Drawing Sheets

SPECTRUM AND BIN REASSIGNMENT PROTOCOL FOR ADSL

FIELD OF THE INVENTION

The invention relates to improvements in communications technology and in particular the improvements in Asymmetric Digital Subscriber Line (ADSL) systems using Frequency Division Multiplexed (FDM) modems to maintain a desired downstream to upstream data rate ratio in the face of long and severely impaired loops.

BACKGROUND OF THE INVENTION

New technologies have been applied to solve problems created by a bandwidth hungry communications applications. One of the new technologies is the Asymmetric Digital Subscriber Line (ADSL). ADSL has promised high downstream rates to support services such as high speed Internet data access, video and audio streaming. While ADSL can be implemented in several different forms, in one form Frequency Division Multiplexed (FDM) systems provide bandwidth for both upstream and downstream flow. Desirably, the upstream rates are much lower as compared to the downstream rates. Typically the upstream spectrum for ADSL is placed lower in the frequency band as compared to the downstream spectrum.

For normal loops, loops which are considered short to medium in length, it is possible to achieve the high downstream rates. However using FDM systems implementing ADSL for long and severely impaired loops, that is loops impaired with cross talk and reasonably high noise floors, the modems may either fail to connect or if they synchronize, the downstream data rates are much lower than the upstream rates. This of course is not what ADSL is designed to provide. Particularly, the goal is to have downstream data rates larger, and perhaps much larger, than upstream data rates.

SUMMARY OF THE INVENTION

The foregoing problem can be overcome in accordance with the invention in an Asymmetric Digital Subscriber Line (ADSL) system that includes a pair of separately-placed Frequency Division Multiplex (FDM) modems connected to a bi-directional channel. Typical FDM implementations of ASDL place the upstream spectrum at the low end of the frequency range and the downstream spectrum at the high end. However, under the current invention, bandwidth is reapportioned, e.g., the dividing line between the upstream and downstream spectrum is moved down in frequency so as to increase the bandwidth allocated to the downstream spectrum (and correspondingly reduce the bandwidth allocated to the upstream spectrum) so as to maintain or attempt to maintain the desired downstream to upstream data rate ratio.

The first modem is configured to transmit downstream and the second modem is configured to transmit upstream. A method is further employed to apportion bandwidth between the upstream and downstream portions of the channel (i.e., between two separate modems) so as to satisfy a desired downstream to upstream data rate ratio. The method is capable of execution from the standpoint of either modem. The method includes the following features:

a. measuring at least one upstream and downstream channel parameter for a prevailing bandwidth apportionment, b. determining, from the measured parameters, a downstream to upstream data rate ratio, c. comparing the determined data ratio to a desired ratio, and if the determined ratio is less than the desired ratio, d. adjusting the bandwidth apportionment and repeating steps a) through c).

BRIEF DESCRIPTION OF THE DRAWINGS

The invention will be further described in the following portion of the specification when taken in conjunction with the attached drawings in which.

DETAILED DESCRIPTION OF THE INVENTION

Figure 1:
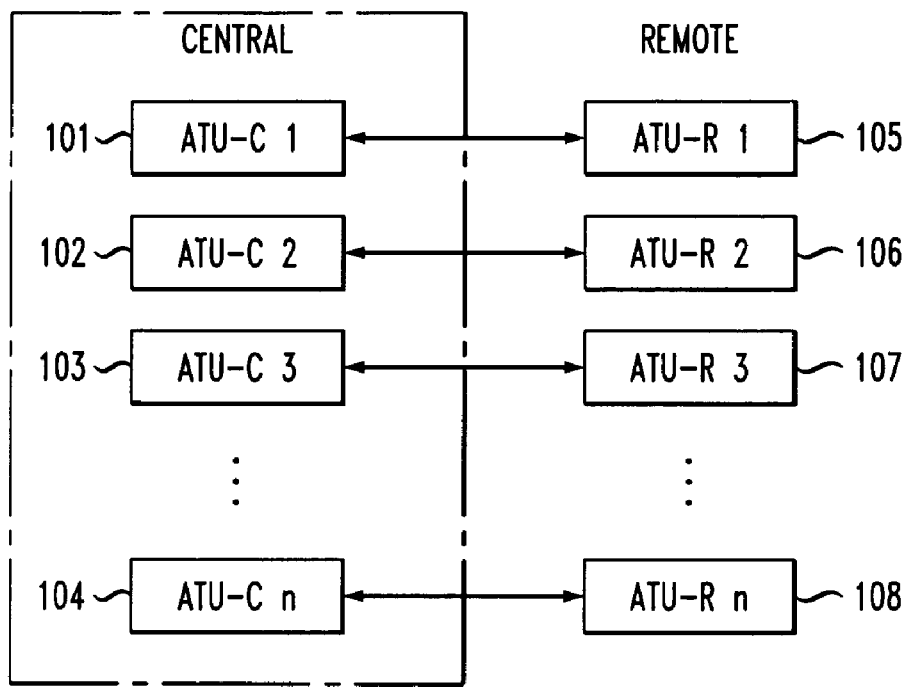
FIG. 1 is a block diagram showing the context in which the invention is employed.

FIG. 1 discloses a block diagram of the invention, where one or more modems (101-104) are configured within a Central Office end (ATU-C). The Central Office modems each communicate with a respective remote modem (105-108) that is configured at a remote or Subscriber end (ATU-R). In accordance with an embodiment of the invention, signal to noise ratio is measured at the first (central) modem. Once measured, the ratio is transmitted to the second (remote) modem, e.g. the modem transmitting upstream. Thus the second modem employs the measured signal to noise ratios to determine a downstream to upstream data rate ratio and then compare the determined ratio to a ratio desired by the user or subscriber. Furthermore, the second modem is configured to determine the adjusted levels for bandwidth apportionment. For example, the remote modem(s) (ATU-R) can move a portion of upstream bandwidth to the downstream side of the dividing line and subsequently transmit that information to the first modem so the reapportionment can be implemented.

Figure 2:
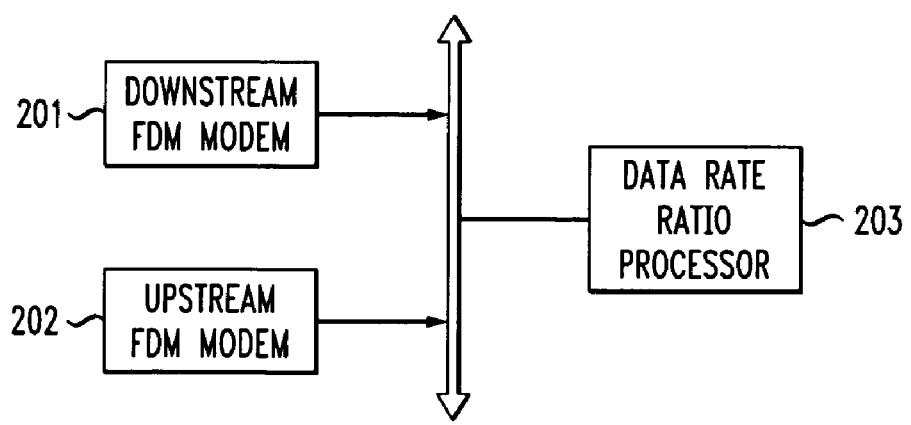
FIG. 2 discloses an embodiment of the invention via an Asymmetric Digital Subscriber Line.
Figure 4:
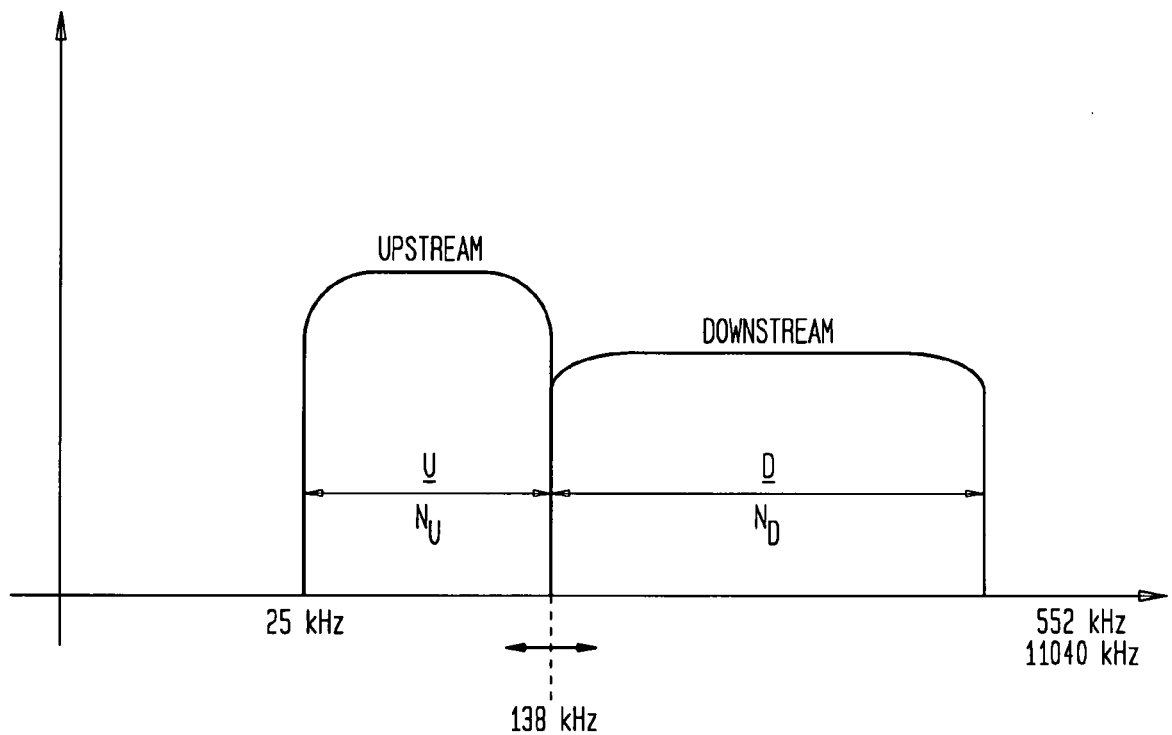
FIG. 4 graphically illustrates the division between upstream and downstream spectrum which may be adjusted in accordance with the present invention.

The invention is also applicable in an Asymmetric Digital Subscriber Line (ADSL) system, illustrated in FIG. 2. A pair of Frequency Division Multiplex (FDM) modems (201, 202) are connected to a bi-directional channel. In this configuration, the first modem 201 transmits downstream and a second modem 202 transmits upstream, where the system includes a processing device 203 that establishes a desired downstream to upstream data rate ratio. The available spectrum is broken into fixed bandwidth bins, where frequency $\Delta f$ of each bin is preferably fixed at 4.3125 kHz. As per standards, the upstream bandwidth is typically from 25.875 kHz to 138 kHz (see FIG. 4), thus with $\Delta f=4.3125$ kHz the upstream bins could be configured to have 26 upstream bins, with each carrying 2 to 15 bits/Hz. The processing device 203 is embedded or programmed to measure at least one upstream and downstream channel parameter or ratio for a prevailing bandwidth apportionment. Once the parameter is measured, a desired downstream-to-upstream rate ratio is targeted. A comparator (not shown) in the processing device then compares the determined ratio to the desired ratio. If the determined ratio is determined to be less than the desired ratio, the processing device executes a control mechanism or algorithm in order to adjust the prevailing bandwidth apportionment. While FIG. 2 exemplifies a single processing apparatus, it is understood that the above may be identically executed with multiple processing apparatuses of varying configurations.

Figure 3A:
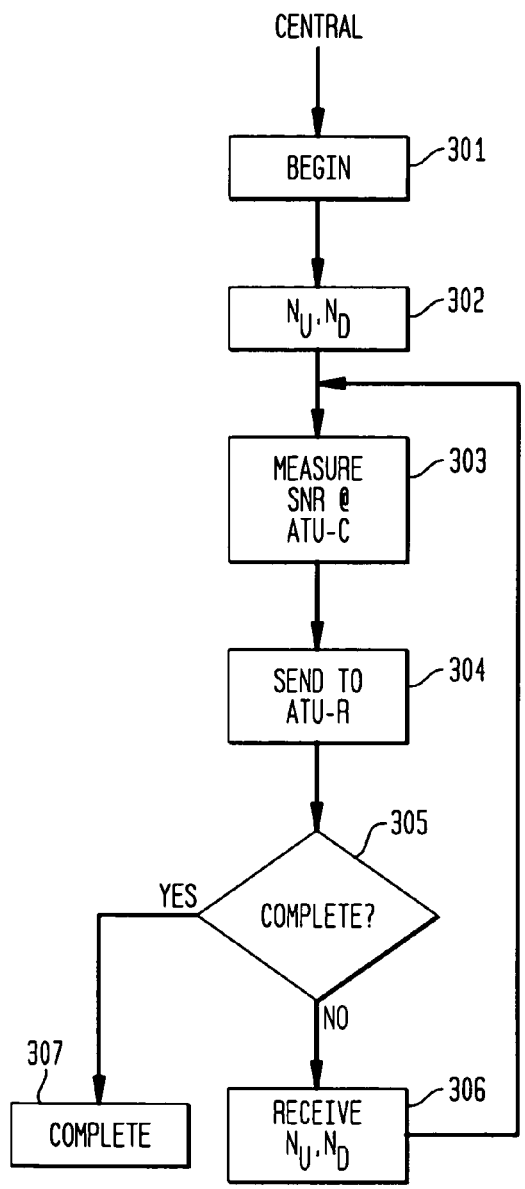
FIG. 3a is a flow diagram of the method steps implemented at the central location which cooperate with other method steps implemented at the remote location.
Figure 3B:
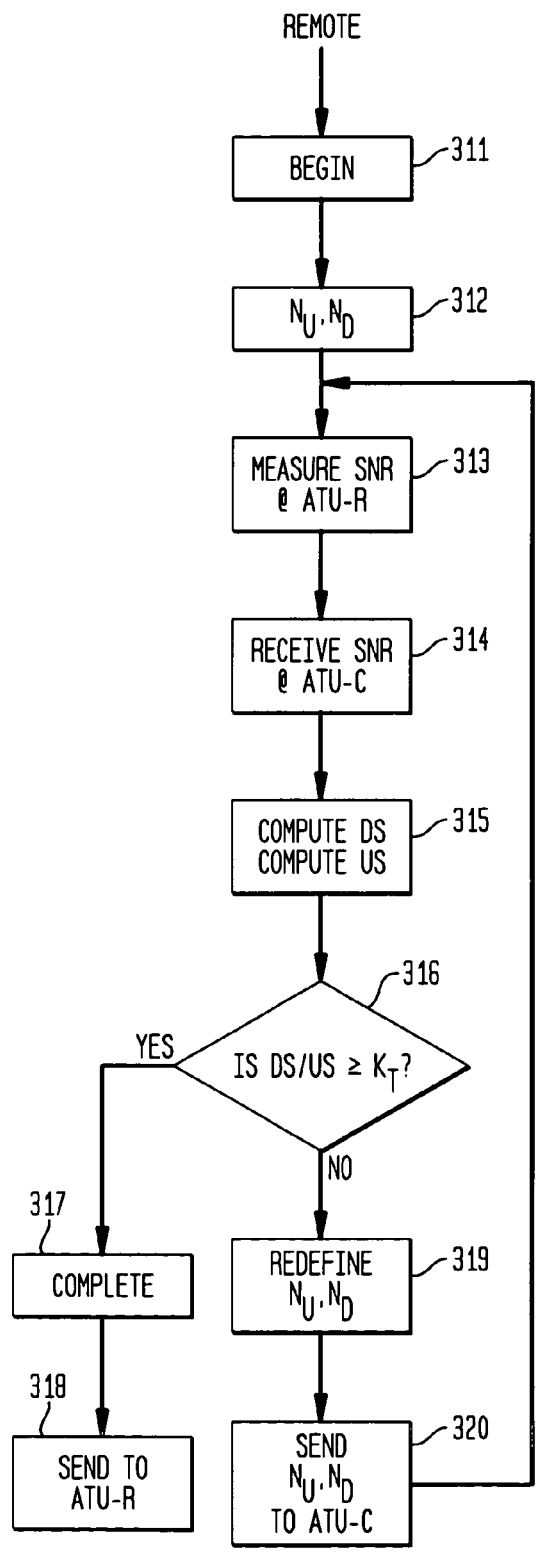
FIG. 3b illustrates the method steps implemented at the remote location to cooperate with the method steps implemented at the central location in order to implement the invention.

The illustration of FIGS. 3A and 3B shows the steps carried out to control the apportionment of bandwidth. From the central office, the process is initiated 301, where the processing apparatus establishes the size of the upstream ($N_u$) and Downstream ($N_D$) spectrums in step 302. An illustration of the bandwidths $N_U$ and $N_D$ can be seen in FIG. 4. The processing apparatus then measures the signal-to-noise ratio (SNR) at the central office modem (ATU-C), step 303. Once established, the SNR is sent to the remote site modem (ATU-R) in step 304. If the bandwidth apportionment is completed 305, the process ends 307. However, if a new or further reapportionment is required, the processing apparatus receives the parameters $N_U$ and $N_D$ for the next iteration, and the process reverts back to 303 as shown in FIG. 3A.

FIG. 3B further illustrates the steps carried out for bandwidth reapportioning at the remote modem side. After the remote modem begins the process 311, the size of the upstream and downstream spectrum is established 312. Once the size is determined, the SNR is then measured 313. Once the SNR is received 314 (sent in step 304 of FIG. 3A), the remote site computes the downstream (DS) and upstream (US) data rates 315 and then makes a determination in 316 whether the DS/US ratio is greater than a desired ratio $K_T$. If the DS/US ratio is determined to be at an acceptable level, the algorithm completes 317 and then establishes and sends the ratio to the remote modem (ATU-R) 318.

If the ratio is not acceptable, the algorithm proceeds to 319, where $N_U$ and $N_D$ is redefined and then sent back to the central modem (ATU-C) 320, where the process in FIG. 3A is executed.

For example, once the upstream and downstream SNR's are measured, the algorithm may compute and determine that the downstream data rate is less than the upstream data rate. In this example, it is assumed that 8 bins were assigned to the downstream and 4 bins were assigned to the upstream. If the last five bins in the downstream channel have a low SNR, those bins may not be used since they cannot carry bits that are dependent on the line characteristic and can vary from line to line. Thus, if a fixed number of bits are assigned to each bin (8 bits/Hz/bin):

upstream data rate=4 kHz×8 bits/Hz×4=128 k bits downstream data rate=4 kHz×8 bits/Hz×3=9.6 k bits.

From this case it is evident that the downstream rate will be less than the upstream rate (thus the DS/US will be less than the desired ratio [DS/US<1]). Under the present invention, the downstream rates are modified in order to keep them greater than the upstream rates at any given time during the transmission. Under one embodiment, the protocol increases the downstream data rates in relation to the upstream rates by reassigning the bins according to the predetermined ratio. In other words the number of bins assigned to the downstream transmission ($N_D$) is increased, and as a consequence, $N_U$ is decreased. The desired ratio is typically greater than one, and is determined at the time of startup. The protocol under the present invention can either re-define the upstream and the downstream spectral bands, or may assign the initially assigned upstream bins to the downstream for increasing the downstream data rates. It is understood that the channel bandwidth apportionment may also be configured dynamically, so that channel characteristics that change over time may be taken into configuration. It is also understood that the defined DS/US ratio may be fixed at various values in accordance with the designer's needs.

The invention claimed is:

1. In a system containing a modem adapted to be communicatively coupled to a bi-directional channel, a method of apportioning bandwidth between an upstream and a downstream portion of the channel so as to satisfy a desired downstream to upstream data rate ratio, comprising the steps of:
   a) measuring at least one upstream and downstream channel parameter for a prevailing bandwidth apportionment;
   b) determining, from the measured parameters, a downstream to upstream data rate ratio;
   c) comparing the determined ratio to the desired ratio; and
   d) if the determined ratio is less than the desired ratio, adjusting the bandwidth apportionment and repeating steps a) to c).

2. A method as recited in claim 1 wherein steps a) to c) are repeated until the determined ratio is no longer less than the desired ratio.

3. A method as recited in claim 1 which includes the further step, if the determined ratio is at least equal to the desired ratio, of initiating communications in the channels using the prevailing bandwidth apportionment.

4. A method as recited in claim 1 wherein the at least one channel parameter is signal to noise ratio.

5. A method as recited in claim 4 wherein the measuring of signal to noise ratio is effected at the upstream and downstream portions and which includes the further step of communicating the measured parameter from the downstream portion to the upstream portion and wherein the determining and comparing steps are effected at the upstream portion.

6. A method as recited in claim 4 wherein the step of adjusting the bandwidth apportionment includes communicating downstream bandwidth apportionment from the upstream to downstream portion.

7. A method as recited in claim 1, wherein the system is an Asymmetric Digital Subscriber Line (ADSL) system.

8. A method as recited in claim 1, wherein the modem is a Frequency Division Multiplex (FDM) modem.

9. A system containing a modem adapted to be communicatively coupled to a bi-directional channel, and further containing an upstream and a downstream portion of the channel, which system includes apparatus to satisfy a desired downstream to upstream data rate ratio, where the system further includes:
   a) measuring protocol to measure at least one upstream and downstream channel parameter for a prevailing bandwidth apportionment;
   b) a secondary protocol, responsive to the measuring protocol for determining, from the measured parameters, a downstream to upstream data rate ratio;
   c) a comparator comparing the determined ratio to the desired ratio; and
   d) a control protocol, responsive to the comparison, to adjust a prevailing bandwidth apportionment if the determined ratio is less than the desired ratio.

10. The system of claim 9 wherein the control protocol initiates communications using a prevailing bandwidth apportionment in the event the comparison indicates the determined ratio is equal to or greater than the desired ratio.

11. The system of claim 9 wherein the at least one channel parameter is signal to noise ratio.

12. The system of claim 9 wherein the measuring protocol includes:
   a) a first measurement circuit at the downstream portion for measuring downstream signal to noise ratio;
   b) a second measurement circuit at the upstream portion for measuring upstream signal to noise ratio; and
   c) transfer means located at the downstream portion for transmitting the downstream signal to noise measurement to the upstream portion.

13. The system of claim 12, further comprising second transfer means to transmit adjustments in prevailing bandwidth apportionment to the downstream portion.

14. The system of claim 9 wherein the modem is a Frequency Division Multiplex (FDM) modem.

15. The system of claim 9 wherein the modem is incorporated in a pair of banks of modems.

16. The system of claim 9 wherein the system is an Asymmetric Digital Subscriber Line (ADSL) system.

17. In a modem adapted to be communicatively coupled to a second modem via a bi-directional channel, a method of apportioning bandwidth between an upstream and a downstream portion of the channel to satisfy a desired downstream to upstream data ratio, comprising the steps of:
   a) measuring at least one downstream channel parameter for a prevailing bandwidth apportionment;
   b) receiving from the second modem at least one upstream channel parameter;
   c) determining from the measured and received parameters a downstream to upstream data rate ratio; and
   d) adjusting the prevailing bandwidth apportionment and repeat steps a) through c) if the determined ratio is less than the desired ratio.

18. A method as recited in claim 17 which includes the further step, if the determined ratio is at least equal to the desired ratio, of initiating communications in the channels using the prevailing bandwidth apportionment.

19. A method as recited in claim 17 wherein the at least one channel parameter is signal to noise ratio.

20. A method as recited in claim 19 wherein the measuring of signal to noise ratio is effected at the upstream and downstream portions and which includes the further step of communicating the measured parameter from the downstream portion to the upstream portion and wherein the determining step is effected at the upstream portion.

21. A method as recited in claim 17 wherein the step of adjusting the bandwidth apportionment includes communicating downstream bandwidth apportionment from the upstream to downstream portion.

22. A method as recited in claim 17, wherein the modems are Frequency Division Multiplex (FDM) modems.

23. In a modem adapted to be communicatively coupled to a second modem via a bi-directional channel, a method of apportioning bandwidth between an upstream and a downstream portion of the channel to satisfy a desired downstream to upstream data ratio, comprising the steps of:
   a) measuring at least one upstream channel parameter for a prevailing bandwidth apportionment;
   b) transmitting the measured parameter to the second modem;
   c) receiving from the second modem a new prevailing bandwidth apportionment if sent; and
   d) repeating steps a) through c) if the new prevailing bandwidth apportionment is received.

24. A method as recited in claim 23 wherein the at least one channel parameter is signal to noise ratio.

25. A method as recited in claim 24 wherein the measuring of signal to noise ratio is effected at the upstream and downstream portions and which includes the further step of communicating the measured parameter from the downstream portion to the upstream portion.

26. A method as recited in claim 23 wherein the bandwidth apportionment includes communicating downstream bandwidth apportionment from the upstream to downstream portion.

27. A method as recited in claim 23, wherein said modem and second modem are Frequency Division Multiplex (FDM) modems.

28. A method a recited in claim 23, wherein said modem and second modem are communicatively coupled through a Asymmetric Digital Subscriber Line (ADSL) system.

29. In an Asymmetric Digital Subscriber Line (ADSL) system containing a modem which is adapted to be communicatively coupled to a bi-directional, a method of apportioning bandwidth between an upstream and a downstream portion of the channel so as to satisfy a desired downstream to upstream data rate ratio, comprising the steps of:
   a) measuring at least one upstream and downstream channel parameter for a prevailing bandwidth apportionment;
   b) determining, from the measured parameters, a downstream to upstream data rate ratio;
   c) comparing the determined ratio to the desired ratio; and
   d) if the determined ratio is less than the desired ratio, adjusting the bandwidth apportionment and repeating steps a) to c),
   wherein the at least one upstream and downstream channel parameter is signal to noise ratio.

30. The method of claim 29 wherein steps a) to c) are repeated until the determined ratio is no longer less than the desired ratio.

31. The method of claim 29, wherein the measuring of signal to noise ratio is measured at an upstream modem and at a downstream modem adapted to be communicatively coupled to said bi-directional channel, the method further comprising the step of communicating the parameter measured at the upstream modem to the downstream modem, wherein the determining and comparing steps are effected at the downstream modem.

32. The method of claim 29, wherein the measuring of signal to noise ratio is measured at an upstream modem and at a downstream modem adapted to be communicatively coupled to said bi-directional channel, the method further comprising the step of communicating the parameter measured at the downstream modem to the upstream modem, wherein the determining and comparing steps are effected at the upstream modem.

33. The method of claim 29, wherein the step of adjusting the bandwidth apportionment includes communicating downstream bandwidth apportionment from a downstream modem adapted to be communicatively coupled to said bi-directional channel downstream portion to an upstream modem adapted to be communicatively coupled to said bi-directional channel.

34. An Asymmetric Digital Subscriber Line (ADSL) system containing a modem which is adapted to be communicatively coupled to a bi-directional channel, and further containing an upstream and a downstream portion of the channel, which system includes apparatus to satisfy a desired downstream to upstream data rate ratio, where the system further includes:
  a) measuring protocol to measure at least one upstream and downstream channel parameter for a prevailing bandwidth apportionment;
  b) a secondary protocol, responsive to the measuring protocol for determining, from the measured parameters, a downstream to upstream data rate ratio;
  c) a comparator comparing the determined ratio to the desired ratio; and
  d) a control protocol, responsive to the comparison, to adjust a prevailing bandwidth apportionment if the determined ratio is less than the desired ratio,
  wherein the at least one upstream and downstream channel parameter is signal to noise ratio.

35. The system of claim 34 wherein the control protocol initiates communications using a prevailing bandwidth apportionment in the event the comparison indicates the determined ratio is equal to or greater than the desired ratio.

36. The system of 34, wherein the system includes an upstream modem and at a downstream modem adapted to be communicatively coupled to said bi-directional channel, wherein the measuring protocol includes:
  a) a first measurement circuit for measuring downstream signal to noise ratio at the downstream modem;
  b) a second measurement circuit for measuring upstream signal to noise ratio at the upstream modem; and
  c) transfer means for transmitting the upstream signal to noise measurement to the downstream modem.

37. The system of 34, wherein the system includes an upstream modem and at a downstream modem adapted to be communicatively coupled to said bi-directional channel, wherein the measuring protocol includes:
  a) a first measurement circuit for measuring downstream signal to noise ratio at the downstream modem;
  b) a second measurement circuit for measuring upstream signal to noise ratio at the upstream modem; and
  c) transfer means for transmitting the downstream signal to noise measurement to the upstream modem.

38. In a modem adapted to be communicatively coupled to a second modem via a bi-directional channel, a method of apportioning bandwidth between an upstream and a downstream portion of the channel to satisfy a desired downstream to upstream data ratio, comprising the steps of:
  a) measuring at least one downstream channel parameter for a prevailing bandwidth apportionment;
  b) receiving from the second modem at least one upstream channel parameter;
  c) determining from the measured and received parameters a downstream to upstream data rate ratio; and
  d) adjusting the prevailing bandwidth apportionment and repeat steps a) through c) if the determined ratio is less than the desired ratio,
  wherein the modems are Frequency Division Multiplex (FDM) modems, and
  wherein the at least one upstream and downstream channel parameter is signal to noise ratio.

39. The method of claim 38 wherein the measuring of signal to noise ratio is measured at an upstream modem and at a downstream modem adapted to be communicatively coupled to said bi-directional channel, the method further comprising the step of communicating the parameter measured at the upstream modem to the downstream modem, wherein the determining step is effected at the downstream modem.

40. The method of claim 38 wherein the measuring of signal to noise ratio is measured at an upstream modem and at a downstream modem adapted to be communicatively coupled to said bi-directional channel, the method further comprising the step of communicating the parameter measured at the downstream modem to the upstream modem, wherein the determining step is effected at the upstream modem.

41. The method of claim 38, wherein the step of adjusting the bandwidth apportionment includes communicating downstream bandwidth apportionment from a downstream modem adapted to be communicatively coupled to said bi-directional channel to an upstream modem adapted to be communicatively coupled to said bi-directional channel.

42. A method of apportioning bandwidth between an upstream and a downstream portion of a bi-directional channel so as to satisfy a desired downstream to upstream data rate ratio, comprising the steps of:
  a) measuring at least one upstream and downstream channel parameter for a prevailing bandwidth apportionment;
  b) determining, from the measured parameters, a downstream to upstream data rate ratio;
  c) comparing the determined ratio to the desired ratio; and
  d) if the determined ratio is less than the desired ratio, adjusting the bandwidth apportionment and repeating steps a) to c).

* * * * *